United States Patent [19]

Robinson et al.

[11] Patent Number: 4,763,280

[45] Date of Patent: Aug. 9, 1988

[54] CURVILINEAR DYNAMIC IMAGE GENERATION SYSTEM

[75] Inventors: John A. Robinson, Sandy; Robert A. Schumacker, Salt Lake City, both of Utah

[73] Assignee: Evans & Sutherland Computer Corp., Salt Lake City, Utah

[21] Appl. No.: 728,360

[22] Filed: Apr. 29, 1985

[51] Int. Cl.[4] .................... G06F 15/72; G06F 15/62; G09G 3/00

[52] U.S. Cl. ................................ 364/518; 340/705; 340/732

[58] Field of Search .................. 364/518, 520–522; 350/128; 340/705, 729, 731, 747, 732; 358/10, 22, 56, 104

[56] References Cited

U.S. PATENT DOCUMENTS

| | | | |
|---|---|---|---|
| 3,418,459 | 12/1968 | Purdy et al. | 364/522 |
| 4,222,106 | 9/1980 | Hess et al. | 364/521 |
| 4,305,057 | 12/1981 | Rolston | 340/705 |
| 4,347,507 | 8/1982 | Spooner | 340/705 |
| 4,616,217 | 10/1986 | Nesbitt et al. | 340/747 |

FOREIGN PATENT DOCUMENTS 2144608A 3/1985 United Kingdom ................ 364/522

Primary Examiner—Felix D. Gruber
Attorney, Agent, or Firm—Nilsson, Robbins, Dalgarn, Berliner, Carson & Wurst

[57] ABSTRACT

A system is disclosed for the production of real-time, computer-generated images as for projection on a curvilinear surface as on the inside of a dome. A general-purpose computer provides data for visual images and supplies the data in an ordered format. Such data is processed first with regard to viewpoint and second with regard to channel operation. Specifically, viewpoint processing incorporates an object manager and a polygon manager. Channel processing includes a geometric processor and a display processor. The display processor drives a projector for illuminating a spherical surface with the desired images. The geometric processor incorporates several well known elements including a rotator, clippers, a slope calculator and polygon buffer. Additionally, the geometric processor incorporates a segmenter and mapper which replaces the traditional perspective divider to process the data so as to generate images for curvilinear projection. The segmenter tests the character of polygon edges in spherical coordinate format and corrections are performed on data in the same format. Segmentation is performed on data in a rectangular coordinate format.

13 Claims, 5 Drawing Sheets

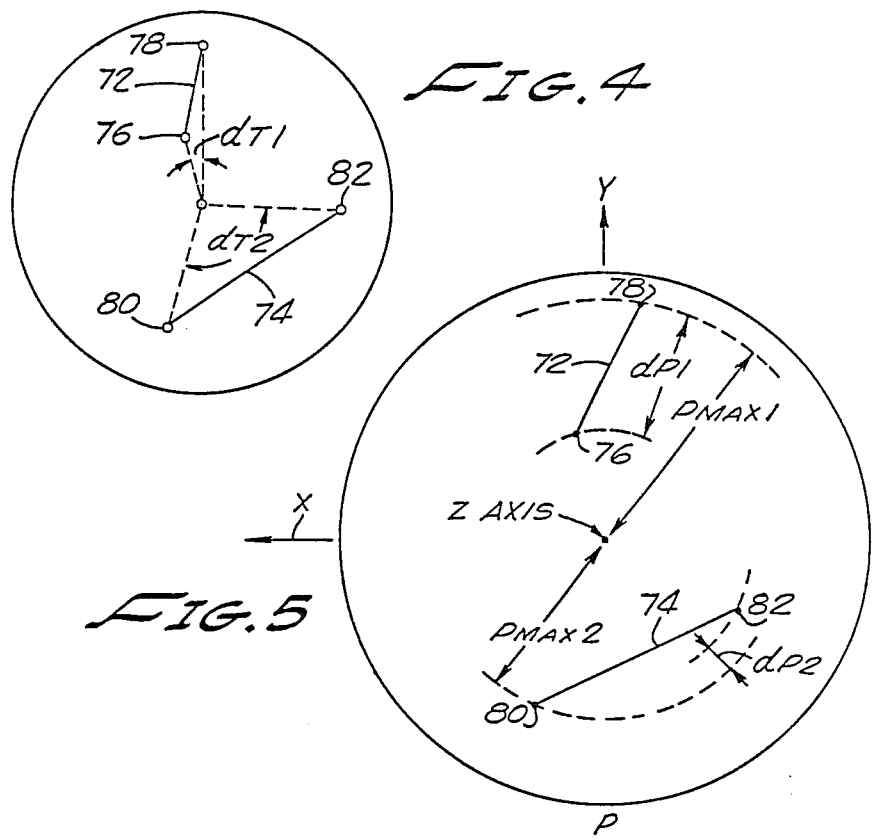
FIG. 4
FIG. 5
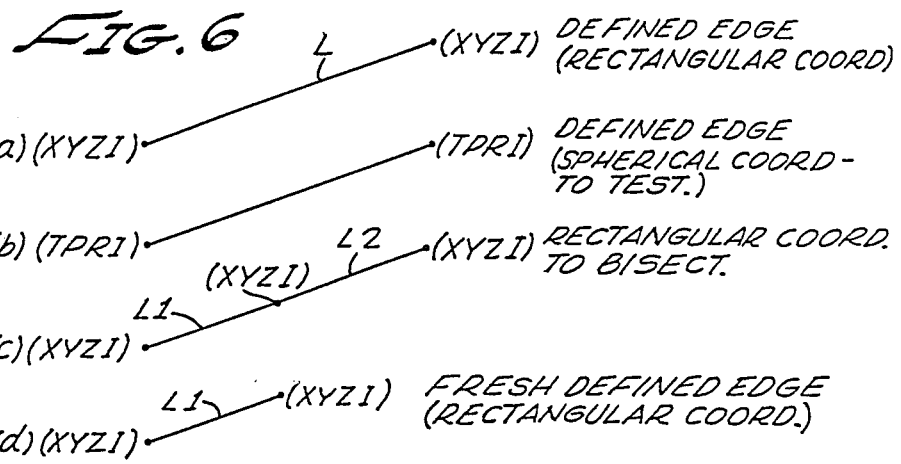
FIG. 6

CURVILINEAR DYNAMIC IMAGE GENERATION SYSTEM

BACKGROUND AND SUMMARY OF THE INVENTION

Computing systems for generating real-time images have been in widespread use for well over a decade. However, demands for improvement continue to challenge the technology. While prior systems have been effectively used in training applications, a need continues for improved realism and flexibility. For example, visual displays for flight simulator training systems have been extremely useful and effective. However, in such applications a need continues for greater realism.

To consider specifics, a need has existed for a system to project real-time, computer-generated images of a dome, rather than a mosaic of flat surfaces. A dome screen offers several advantages. It may be seamless and, therefor, easier to build and watch. Furthermore, it does not cause discontinuities in the slewable target projector image. Conversely, traditional screens comprising a mosaic of flat surfaces have certain disadvantages. For example, screens compel the use of a separate channel for each flat surface. A single curvilinear image generator offers the advantage of projecting a single channel onto a section of a dome within the limitations of image capacity.

Prior systems have been proposed for curvilinear projection. However, such systems generally have involved a two step process retaining the operation of perspective division then applying distortion correction. The technique does not allow fields of view from a single channel to approach 180 degree projection because of the required degree of numerical precision to preserve the integrity of the display at edges.

Consequently, a specific need exists for an improved visual system utilizing real-time, computer-image generation which is economical and effective to project images onto various curvilinear surfaces including cylinders and spheres with projection fields of view up to 180°. It is important that such a system correct distortions created in the optics or which result from the projector being mounted off axis, all with relatively minimal image and system capacity degradation.

In general, the system of the present invention is an improved form of a real-time, computer-generated image apparatus. With reference to prior art systems, the improvement of the present invention resides in the structure generally referred to as the image processor. Specifically, the segmenting and mapping operations in the image processor of the present invention replace the conventional perspective divider and accomplish the improvements and objectives mentioned above. Accordingly, the improved system is capable of projecting images onto a variety of curvilinear surfaces including cylinders and spheres with wide fields of view and incorporating optical or off-axis correction.

BRIEF DESCRIPTION OF THE DRAWINGS

In the drawings, which constitute a part of this specification, exemplary embodiments of the invention are set forth as follows:

FIG. 4 and 5 are diagrams illustrating spherical coordinates as used herein;

FIG. 6 is a diagram illustrating the edge segmentation operation in accordance herewith.

DESCRIPTION OF THE ILLUSTRATIVE EMBODIMENT

As indicated above, a detailed illustrative embodiment of the present invention is disclosed herein. However, data formats, physical components and operating systems structured in accordance with the present invention may be embodied in a wide variety of forms some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
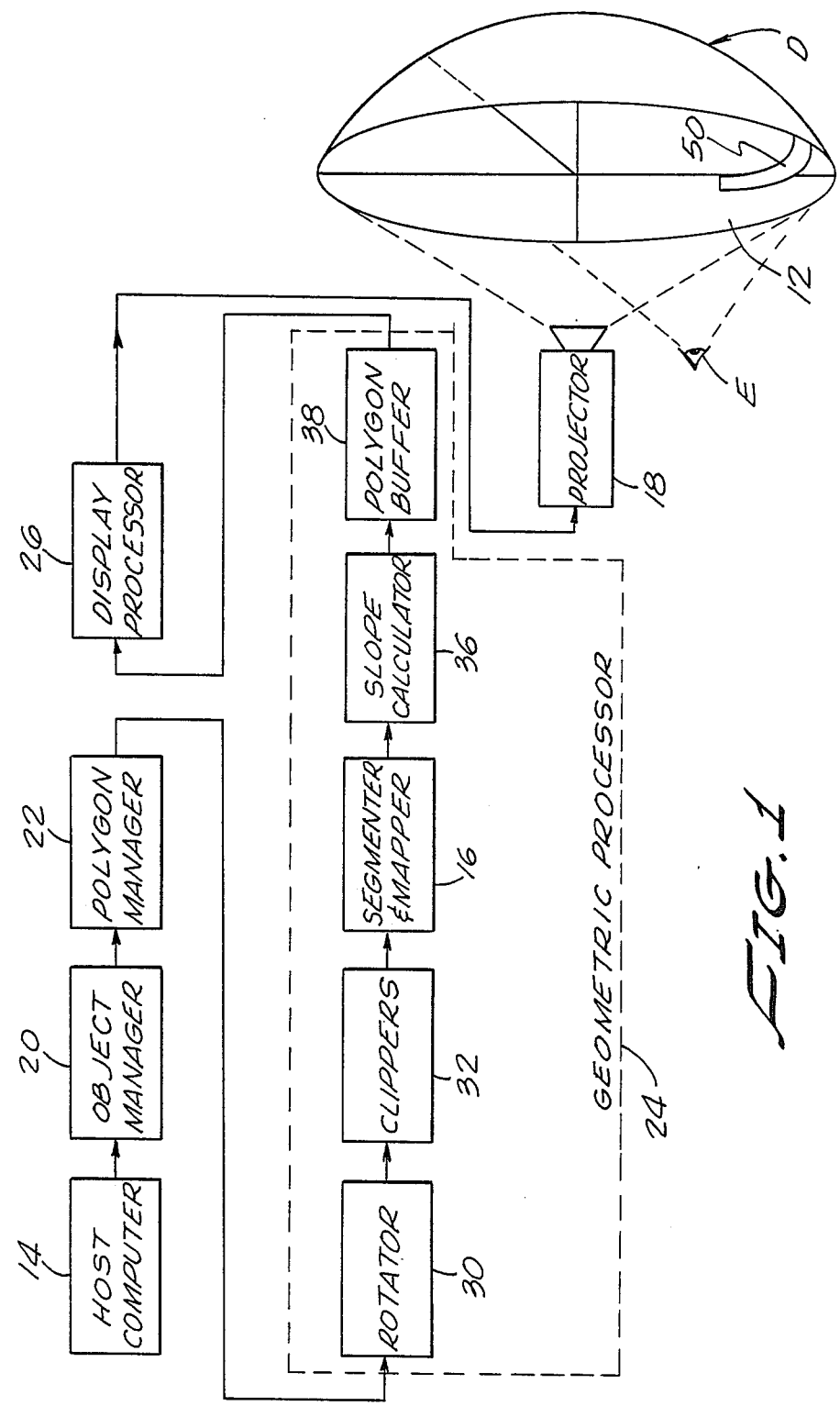
FIG. 1 is a block and schematic diagram of a system incorporating the principles and apparatus of the present invention.

Referring initially to FIG. 1, a system is illustrated for projecting dynamic images on a dome D (right) to be viewed by an observer E. Essentially, the dome D defines a concave, spherical surface or screen 12. A real-time dynamic image projected on the screen 12 affords the observer E a high degree of reality as is important in many forms of training equipment, e.g. flight simulation systems.

As represented in FIG. 1, a host computer 14 (upper left) manages basic data for images to be projected. The host computer 14 incorporates general-purpose capability for management memory and geometric memory so as to perform all computations involved in transforming model space descriptions of scene elements into two-dimensional perspective image data in display space. These steps include the processes of rotation, clipping, and perspective division.

The computer 14 may take the form of apparatus well known in the prior art and readily available. In that regard, several elements in the system of FIG. 1 may take a form similar to a readily available system which also has been described in scientific literature. Specifically, several elements of the system of FIG. 1 may take the form of similar elements used in an apparatus designated as the CT-5, an advanced visual simulation system produced and previously available from Evans & Sutherland Computer Corporation of Salt Lake City, Utah. The CT-5 is described in a publication "A New Visual System Architecture" by Robert A. Schumacker, published in the Proceedings of the Second Interservice/Industry Training Equipment Conference, Nov. 18–20, 1980, presented in Salt Lake City, Utah.

The improvement of the present system to accomplish the objectives as stated above resides essentially in two elements of the block diagram of FIG. 1. It is perhaps noteworthy at this juncture that modifications of the prior-art system are embodied primarily in the segmenter and mapper 16 (FIG. 1, lower center). Additionally, a projector 18 may differ somewhat from that conventionally employed in the CT-5 System in that the projector 18 is designed for spherical projection in accordance with well known optical principles.

In view of the above preliminary considerations, the basic operation of the system of FIG. 1 will now be considered briefly in a preliminary overview, recognizing that certain similar elements have been used in systems for projecting images on plane surfaces and constitute well known structures in image-generation technology.

The system of FIG. 1 is configured as a pipeline of processing units where computing tasks are distributed along a sequence of dedicated computing elements. In that regard, data flows in sequence from the host computer 14 to an object manager 20, a polygon manager 22, through a geometric processor 24 to a display processor 26 and finally to the projector 18. Again, the improvements hereof reside in the geometric processor 24, other elements of the system being essentially as incorporated in the referenced CT-5 system.

Data signals are received in the geometric processor at a rotator 30 for orientation, with the resulting signals provided to clippers 32 for selective elimination. In prior systems (for planar displays) signal representations from the clippers 32 were supplied to a perspective divider; however, in the system of the present invention, output from the clippers 32 is applied to the segmenter and mapper 16. The capability of the system hereof is provided substantially as a result of that structure.

Signals conveying appropriately mapped and segmented data are supplied from the segmenter and mapper 16 to a slope calculator 36 the output of which passes through a polygon buffer 38 to the display processor 26. Emerging from the processor 26, the image data is represented by signals to provide a raster scan display which is accomplished in the projector 18.

It is to be noted that several of the processing units in the pipeline of FIG. 1 incorporate buffer memory capability. Specifically, memory exists in the computer 14, the polygon manager 22, the geometric processor 24, and the display processor 26. Generally, the time of a single raster pattern or television field is allocated to transport and data from one buffer memory to the next. Such scheduling allows the processing hardware to operate at its own pace and be designed to accommodate only the average complexity of an image field.

Recapitulating to some extent, the computer 14 provides data specifying scene elements for the display. Functionally, the pipeline system of the disclosed embodiment transforms such data into a television format for curvilinear projection on the screen 12. The basic data defines polygons, e.g. flat surfaces bounded by straight edges. Each edge is described by a pair of vertices which are defined in rectangular coordinates. Functionally, the system analyzes the polygons from a specific viewpoint, performs the processes of rotation, clipping, segmentation, mapping and so on to accomplish a simulation of the actual scene which is then finally processed to provide a television raster signal for driving the projector 18. A high-intensity projection cathode ray tube or light valve in the projector 18 thus provides a light image on the screen 12.

Reviewing the operation of prior-art portions of the system in somewhat greater detail, the host computer 14 provides the raw data defining each object in a scene. That data is processed by the object manager 20 to order the objects with respect to depth in the scene. Signals representative of that data are supplied to the polygon manager 22 which processes the signal-represented data to define individual polygons as derived from specific objects in the scene. As indicated above, the polygons are flat surfaces bounded by straight edges, each of the edges being defined by pairs of vertices specified in rectangular coordinates.

Signal representations of the polygons are provided from the polygon manager to the geometric processor 24. Within that unit the rotator 30 orients the polygons after which the clippers 32 eliminate portions of polygons to define the specific scene content in the field of view.

The segmenter and mapper 16 receives signals specifying vertices, pairs of which define edges of polygons. In the system of FIG. 1, the segmenter and mapper 16 receives signal-represented vertices specified in a data format X, Y, Z, and I.

In accordance with convention, the X and Y dimensions specify the rectangular abscissa and ordinate while the Z dimension specifies depth, with the origin being at the location of the observer E as illustrated in FIG. 1. The dimension I is indicative of color intensity.

Figure 2A:
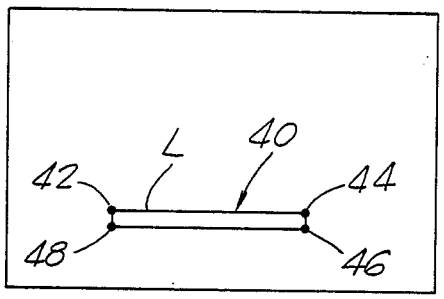
FIGS. 2a and 2b are graphic diagrams illustrating the modifications to display data by segmentation in accordance herewith.

The graphic representation of FIG. 2a is illustrative of the system operation to represent polygons. A polygon 40 is bounded by four edges each of which is defined by a pair of the vertices 42, 44, 46, or 48. For example, the straight line between the vertices 42 and 44 defines the upper edge of the polygon 40. Data representative of that upper edge is provided from the clippers 32 (FIG. 1) to the segmenter and mapper 16 in the form of signals representative of the coordinates (X, Y, Z, and I) for the vertices 42 and 44.

Figure 2B:
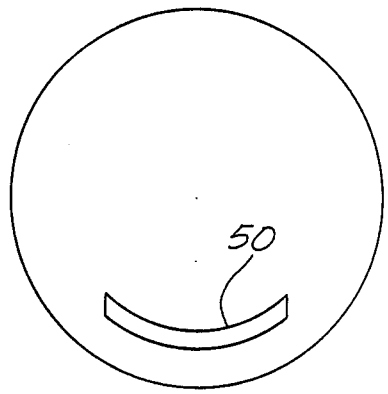

Pursuing a consideration of the polygon 40 (FIG. 2a), assume the desire to project that figure on a spherical surface. In that event, it must be recognized that the straight lines or edges of the polygon 40 do not map as straight lines at the pixel plane. A realistic representation of the polygon 40 (FIG. 2a) requires mapping to accomplish the arcuate form 50 as illustrated in FIG. 2b. The concept is illustrated in FIG. 1 wherein the arcuate form 50 actually appears to the observer E substantially as a straight line, the horizon raising to the sky.

The projection of images as generally considered above onto a dome as the spherical screen 12 (FIG. 1) is further complicated by the need for correction of optical distortion and off-axis projection distortion. Complicating the situation still further, the amount of error (required degree of correction) is a function not only of edge length but also position and orientation of the edge. In general, the segmenter and mapper 16 performs such corrections to accomplish the modifications for curvilinear mapping to enable projection onto curvilinear surfaces. Such correction includes segmenting edges to the degree required based upon the criteria indicated above. In that regard, reference will now be made to FIG. 3 to illustrate the operations.

Figure 3A:
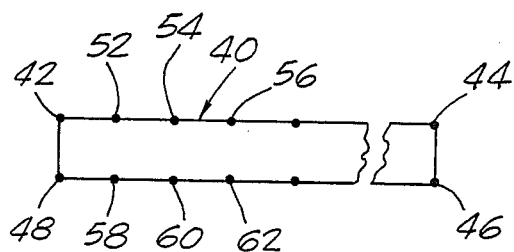
FIGS. 3a and 3b are enlarged views of fragments of FIGS. 2a and 2b respectively showing the segmentation in greater detail.
Figure 3B:
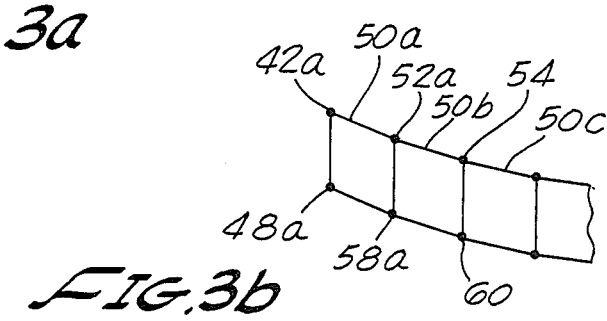

A fragment of the polygon 40 is shown enlarged in FIG. 3a. As before, the polygon is defined by the vertices 42, 44, 46, and 48. Essentially, as explained above, the slim, elongate polygon 40 must be converted for spherical display to the arcuate form 50, a fragment of which is illustrated in FIG. 3b. Recognizing that the system represents polygon edges as straight lines, to accomplish the arcuate form 50, the edge between vertices 42 and 44 (along with the edge between vertices 46 and 48) must be segmented into short-length edges which can simulate the arcuate form 50. As explained in detail below, each edge in a scene is tested in accordance with a stated criteria. If an edge is too long, it is subdivided for compliance with standards adopted for the image and processed in a cyclic or interim process.

Referring to FIG. 3a, the edge defined between the vertices 42 and 44 would be segmented into several edges between newly defined interim vertices. Specifically, an edge would be defined between vertices 42 and 52. Another edge would be defined between vertices 52 and 54, also vertices 54 and 56. Thus, new vertices are defined to in turn define subdivided polygons.

New edges are also created that extend across the original polygon 40 so that new polygons are created. For instance, new edges exist between vertices 52 and 58 and between vertices 54 and 60, and so on. This allows the creation of a polygon 50a (FIG. 3b) defined by the vertices 42a, 48a, 58a, and 52a; a polygon 50b from vertices 52, 58, 60 and 54, and so on. Note that all of the new polygons share an edge with one or more other new polygons. However, the shared edges will not be visible in the projected image. Rather, the aggregate of all of the new polygons 50a, 50b, 50c, and so on (FIG. 3b) form an approximation to the desired arcuate form 50 as illustrated in FIG. 2b. The degree of accuracy of the approximation is limited only by the amount of segmentation. The appropriate segmentation of edges and the modifications thereof to accomplish the desired correction are treated below with reference to FIG. 8 showing a detailed diagram of the segmenter and mapper 16.

Figure 8:
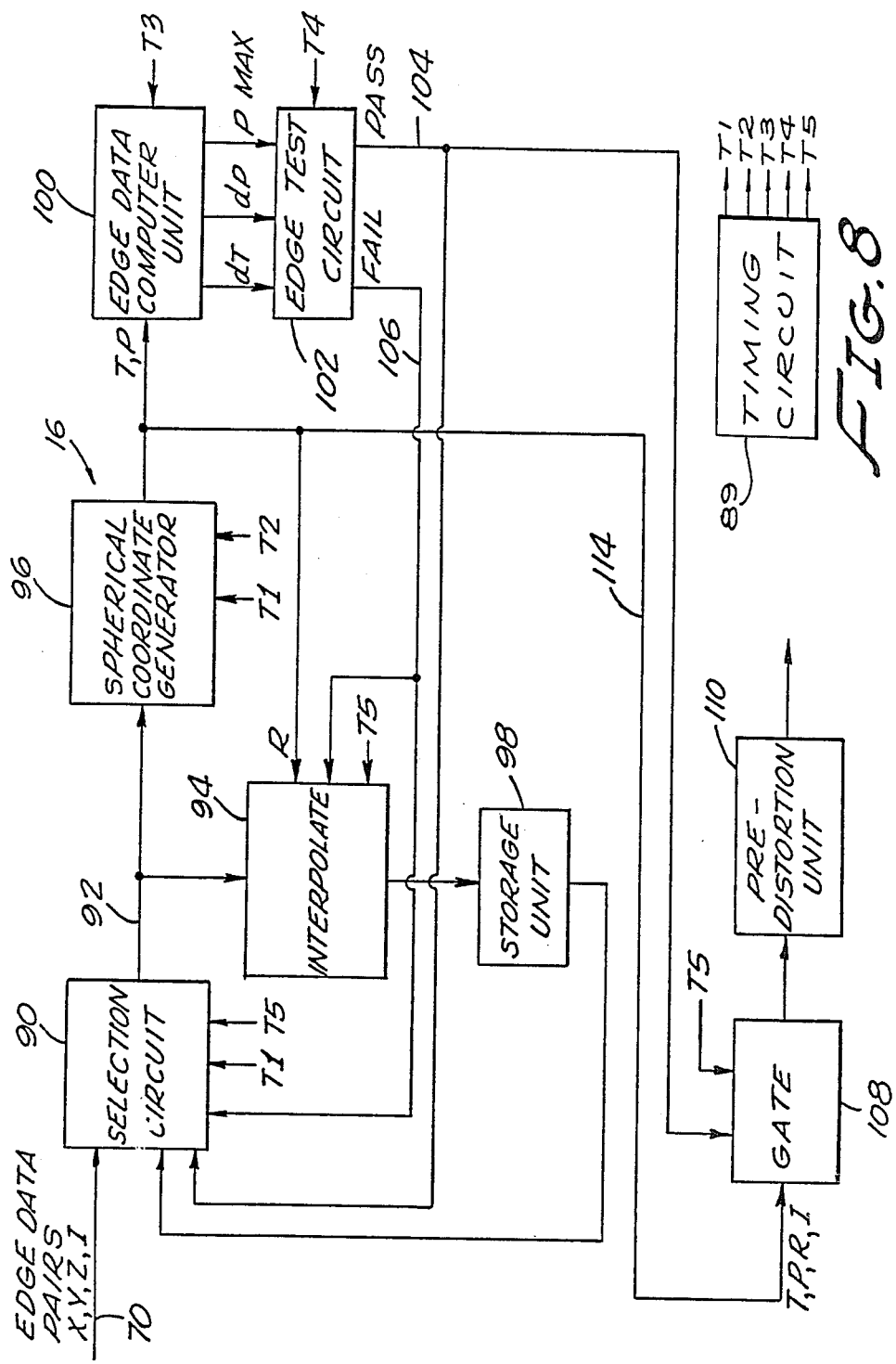
FIG. 8 is a block diagram of a component in the system of FIG. 1.

As indicated in FIG. 8, signals definitive of polygon edges (pairs of vertices) are received in a line 70 for processing. As explained above, each edge is defined by a pair of vertices which are in turn defined or specified by rectangular coordinates X, Y, Z, and I. Recapitulating, the terms X, Y, and Z specify a point in three-dimensional space while the term I specifies image intensity. Classic represenation of such edges is illustrated in the book, "Principles of Interactive Computer Graphics", 1979, by Newman & Sproull, 2Edition, at page 342.

In processing the data received in the line 70, edges are organized for orderly individual processing then translations are made between a rectangular-coordinate format and a spherical coordinate format. Consequently, preliminary to considering details of the system of FIG. 8, brief reference will be made to FIGS. 4 and 5 related to the dome D, to explain the spherical coordinate format of the exemplary embodiment.

Preliminarily, the spherical coordinate format simply involves two angles (T and P) and a distance (R). Specifically, the angle T (FIG. 4) manifests rotational displacement about the traditional computer graphics Z axis in the X, Y plane from the X axis. The angle P (FIG. 5) manifests the angular displacement from the Z axis. In accordance with tradition, the center of the screen is defined by the Z axis. The distance R is the distance to the vertex.

Referring to the flat, circular compass-like plot of FIG. 4, a pair of edges 72 and 74 are illustrated from the viewpoint of directional measurement (somewhat analogous to a compass plot). The edge 72 is defined by vertices 76 and 78. The angular offset for the vertices 76 and 78 is manifest by angles T, the difference between the two angles T as indicated in FIG. 4 is dT1. Similarly, the edge 74 is defined by vertices 80 and 82 which (in the viewing plane of FIG. 4) are directionally specified in angles T, the difference of which is an angle dT2 as illustrated.

The second angular dimension of spherical coordinates (related angle to center) is illustrated by the dome (igloo shape) in FIG. 5 in terms of angular displacement P, i.e. number of blocks in the igloo traversed by the line. Essentially, angles P are manifest in degrees of offset from the center (Z axis at igloo top) as illustrated. The differentials for such angles of an edge are represented as dP1 and dP2. The angle dP1 is the angular differential (igloo blocks) encompassed by the edge 74 while angle dP2 is the angular difference spanned by the edge 74.

In accordance herewith it is important to recognize that the provision of an edge in spherical coordinates, specifically dT (compass points embraced by the edge), dP (igloo blocks embraced by the edge), and Pmax (nearness to rim or edge) enables a determination of whether or not the edge must be segmented for effective curvilinear display. That is, the angles specifying the edge provide the criteria, without regard for the range, or depth of an edge in the field of view. The recognition of that criteria is basic to the system of the present invention. Thus, for determining whether an edge is sufficiently short for effective display in a curvilinear display, the range R (distance in space) from the viewpoint to the vertex) can be ignored.

In the operation of the segmenter and mapper 16 (FIG. 1) as represented in detail (FIG. 8) an orderly progression of signal-represented pairs of vertices (defining edges) are converted from rectangular coordinates to spherical coordinates. Based on such spherical coordinate data, a look-up test table determines whether or not the edge meets the criteria. If the edge does not meet the criteria, it is segmented, then in order, each segment is tested.

When an edge meets the criteria, it is mapped in accordance with a predetermined format to accomplish the spherical projection correction as explained with respect to FIGS. 2 and 3. Thus, the system effectively reduces polygon edges to short lengths to effectively simulate curved edges with short straight-line segments by recognizing that test criteria can comprise merely the angle data of spherical coordinates.

Operations within the system of FIG. 8 are sequenced by an illustrative format utilizing timing signals T1–T5 which may be provided by the host computer 14 (FIG. 1); however, a source block 89 is illustrated in FIG. 8 as an independent source. Edge data (defining a pair of vertices in rectangular coordinates) is received by a selection circuit 90 (FIG. 8) during an initial timing signal T1 in the sequence. Essentially, the selection circuit provides a buffer memory for signals defining edges, supplying signal representations of individual edges in an ordered sequence to an output line 92. The selection circuit may simply comprise an organized memory variously controlled to provide data defining edges as from a developed list.

Signals from the selection circuit 90 representative of edges are supplied through the output line 92 to an interpolator or edge segmentor 94 and a spherical coordinate generator 96. Functionally, the interpolator 94 bisects edges as appropriate. The operation may be as disclosed in U.S. Pat. No. 3,639,736 issued Feb. 1, 1972, to Ivan E. Sutherland. The interpolator supplies data definitive of the resulting fresh edges through a storage unit 98 back to the selection circuit 90.

The spherical coordinate generator 96 acts during the timing signals T1 and T2, functioning to convert edge data to a spherical-coordinate format providing data on the angles P and T (FIGS. 4 and 5) to an edge data computer unit 100. The conversion simply implements certain equations as disclosed below. During timing signal T3, the unit 100 arithmetically combines the angle data to develop signals representative of dT, dP, and Pmax as illustrated in FIGS. 4 and 5. The value of Pmax indicates the greatest value of P in an edge.

To perform the calculations indicated above, the edge data computer unit 100 may simply comprise an arithmetic unit as well known in the prior art for performing the requisite value selection and difference calculations. Signals representative of such values are supplied from the unit 100 to an edge test circuit 102 which is active during the timing signal T4. Using the criteria of dT, dP, and Pmax, the edge test circuit 102 makes a determination based on a table look-up in accordance with certain criteria as treated below. Look-up tables are well known in the art. If the test by reference to the table indicates an edge to be satisfactory, a "pass" signal is provided to an output 104. Conversely, if the edge is not satisfactory on the basis of the applied criteria, a "fail" signal appears at an output 106. The "fail" and "pass" signals are simply binary representations of the two possibilities.

If an edge fails the test criteria and the fail signal appears high at the output 106, the selection circuit 90 and the interpolator 94 (timing signal T5) are instructed to segment (bisect) the edge into two edges which will then be separately tested.

Conversely, if an edge meets the test criteria, the circuit 102 provides the "pass" signal in the output 104 to instruct the selection circuit 90 to proceed with the segmentation processing of a fresh edge. Concurrently, the "pass" signal is applied to a gate 108 allowing signals representative of the approved edge (spherical coordinates) to be applied to a predistortion table unit 110. Again, spherical coordinates facilitate a table look up, in this instance for the desired correction as explained below.

As mentioned above with respect to FIGS. 2 and 3, an approved edge is distorted in accordance with predetermined criteria formulated as a spherical coordinate table for accomplishing the desired simulation of curvature. Accordingly, signals representative of corrected edges are supplied from the unit 110 to the slope calculator 36 (FIG. 1) for further processing by that circuit, then to the polygon buffer 38 and the display processor 26. Essentially, the operations on signals from the unit 110 (FIG. 8) are well known and involve converting represented polygons (defined by edges) into a raster pattern format for driving the projector 18.

In view of the above general description of the system, a complete understanding and appreciation thereof may now best be accomplished by treating an exemplary edge as it moves through the processing pipeline in a signal represented format. In that regard, it will be appreciated that techniques for selecting and preliminarily processing polygons (defined by edges) is in accordance with the prior art as implemented in prior practice. Specifically, referring to FIG. 1, and as explained above, the functions of the host computer 14, the object manager 20, the polygon manager 22, the rotator 30, and the clippers 32, are to provide individual polygon edges defined by pairs of vertices in rectangular coordinates. The preliminary operations involved in the generation of signals representative of such edge pairs in the present system coincide to similar operations for systems employed to project images on plane surfaces, e.g. the commercial system designated CT-5 as identified above.

Pursuing a specific example, assume that the processing operations of the initial portion of the pipeline have produced an edge, specifically the edge L of a polygon defined between the vertices 42 and 44 (FIG. 2a). Accordingly, pairs of signals (X, Y, Z and I) representative of the vertices 42 and 44 (FIG. 2a) are applied to the selection circuit 90 (FIG. 8) through the line 70. The processing for the edge L will now be considered in detail with respect to the segmenter and mapper as illustrated in FIG. 8.

Assume that signals representative of the edge L have been received in the selection circuit 90 and in due course during a timing interval T1 are supplied from a memory stack within the selection circuit 90 through the line 92 to the spherical coordinate generator 96. In the form of a specialpurpose, arithmetic unit the generator 96 converts the signal-represented vertex data from rectangular coordinates into spherical coordinates (FIG. 6b). The generator 96 implements the following formulas for the generation of spherical coordinates from rectangular coordinates. Specifically:

$$R = \sqrt{X^2 + Y^2 + Z^2}$$

$$T = \tan^{-1}(X/Y)$$

$$P = \tan^{-1}(\sqrt{X^2 + Y^2}/Z)$$

In the above expressions, the angles T and P specify the angles defining the position of a projected point on the screen. The value R indicates the range from origin to the projected point. Accordingly, the spherical coordinate generator 96 receives signals during the interval of timing signal T1, executes the above expressions and provides the values R, T, and P for a pair of vertices indicative of the edge L during the timing signal T2, see FIG. 6b.

The signals T and P, representative of the edge vertices in spherical coordinates, are applied to the edge data computer unit 100 (FIG. 8) which manipulates the data to provide signals representative of dT, dP, and Pmax. For the edge L, dT simply constitutes the difference between the values of T for the two vertices. Values representative of such signals are supplied from the computer unit 100 to the edge test circuit 102 during the interval of a timing signal T3.

The edge test circuit 102 evaluates edges considering their distortion in curvilinear projection. With dT, Pmax and dP for each edge, comparisons are made with threshold values. That is, from Pmax and dP, a threshold dT is determined and compared compared with the dT of the edge under consideration. Thus, a decision is made as to whether or not the edge should be subdivided into two separate edges for reevaluation.

An important aspect of the system involves the degree to which edges must be segmented to subdivide polygons for obtaining an image with limited geometric error. The edge test circuit 102 contains a table of edges which exactly meet the distortion criteria. These edges are listed by dP and Pmax. The entry in the table is the dT for that edge. Upon receiving signals representative of data in that form, the edge test circuit 102 enters the table for the specified dT searching for the edge that has the same Pmax and dP. If the dT identified value for the edge in queston is greater than the threshold dT for the table edge, the edge in question is too long for satisfactory spherical projection and must be segmented. Accordingly, a "fail" signal is provided at the output 106.

With regard to the look-up table of the edge test circuit 102, it is important to recognize that determinations are formulated on the basis of angular information on the vertices of the edge but not the distance to those vertices. On the contrary, in using rectangular coordinates to address a look-up table, all three component values (X, Y, Z) would be needed. The use of tables involving those three elements would add considerably to the complexity of the system and may be prohibitive. In spherical coordinates, the direction to the vertex is indicated by just two components, T and P, making the implementation of the tables very practical with state-of-the-art technology. The basis for a need to segment an edge is demonstated in FIG. 4 which reveals how spherical coordinates manifest off-axis lines, contrast edge 72 (primarily radial) against edge 74 (embracing a substantial arc).

With regard to geometric distortion in spherical projection, there is very little geometric distortion in a radially aligned edge. For example, referring to FIG. 4, the edge 72 has only slight deviation from the radial. In that regard, note that the value dT1 is exceedingly small. Conversely, note that the value of dT2 with respect to the edge 74 is quite large. In spherical projection, the edge 74 would experience considerable geometric distortion.

Distortion is also related to values of P and Pmax. Increased distortion tends to occur at the outer edges of a spherical display with the consequence that Pmax becomes significant. Corrections for distortion are treated below; however, for the present it is important to understand that the edge test circuit 102 (FIG. 8) incorporates table look-ups in the predistort function and the edge test function. For both, the tables need only information supplied by the elements P and T of the vertices independent of the element R.

Figure 7:
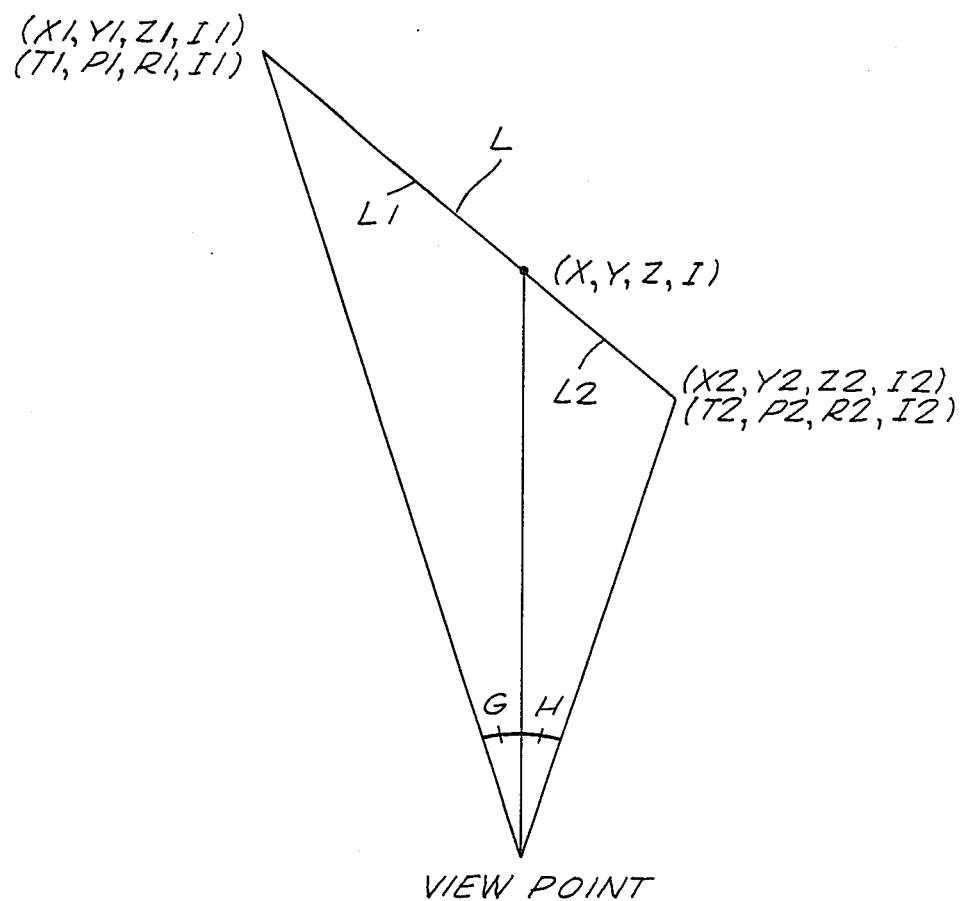
FIG. 7 is a diagram related to the diagrams of FIG. 6.

Returning to consider the processing of the edge L (FIGS. 2a and 6), its length and non-radial position clearly indicate that its values of dT, dP, and Pmax are deemed such that its treatment in the edge test circuit 102 would produce a "fail" signal at the conclusion of the interval T4. That signal at the output 106 actuates the interpolator 94 during the interval of T5 to bisect the edge L as illustrated in FIG. 7. Signals representative of the two edges L1 and L2 (FIG. 6d) resulting from the subdivision are provided from the interpolator 94 through the storage unit 98 to the selection circuit 90 for registration and subsequent independent processing as explained above.

Note that the interpolator 94 operates on rectangular coordinates to segment the edge L. That is, during the interval of T5, if the edge test circuit produces a "fail" signal, the selection circuit 90 again supplies signals representative of the edge L in rectangular coordinate form, in this instance to be accepted by the interpolator 94. Consequently, original edge L is segmented using a set of angle bisector formulas. Specifically:

$$X = X1(1-\text{alpha}) + X2\text{alpha}$$

$$Y = Y1(1-\text{alpha}) + Y2\text{alpha}$$

$$Z = Z1(1-\text{alpha}) + Z2\text{alpha}$$

$$I = (I1 + I2)/2$$

In the above expressions, X, Y, and Z represent the coordinates of the new vertex while X1, Y1, Z1 and X2, Y2, Z2 represent the coordinates for the vertices that define the edge L. Alpha represents R1/(R1+R2) where R1 and R2 are the ranges as stored from the past operation of the generator 96 and supplied as indicated through a line 112. The reason for calculating alpha is to provide the midpoint of the line as the viewer sees it. The calculation is called the bisector formula because the line drawn from the viewpoint to the calculated vertex bisects the angle formed by two lines drawn to the original vertices as shown in FIG. 7. Angles G and H are equal as illustrated.

Further with regard to the bisection, note that the average of the two values of I (intensity) is taken as closer to the value that the display processor would calculate if the edge were not segmented. The average reduces the perceptibility of the change when the edge of a polygon moves across the segmentation threshold.

It is important to understand that after each segmentation of an edge (FIG. 6), the test process is repeated after converting fresh edges to spherical coordinates. Of course, the processing pattern for a series of edges is concluded when a bisection produces the spherical coordinates to produce a "pass" signal from the edge test circuit 102. With regard to the edges as illustrated in FIG. 3, it is apparent that several iterations will be required on the timing cycle T1-T5 to define the edges of limited length, e.g. the several edges extending between vertices 42 and 44 as illustrated.

When the edge test circuit 102 (FIG. 8) produces a "pass" signal, signal representations from the spherical coordinate generator 96 are applied through the line 114 to the gate 108 which is qualified by the timing signal T5. In that manner, the signal-represented spherical coordinates specifying the edge are supplied to the predistortion unit 110.

Generally, two types of distortion are expected in curvilinear projection systems, i.e. radially symmetric and radially assymmetric. Radially symmetric distortion is usually caused by the optical system but can also be caused by mounting the projector on axis with the curvilinear display but not at the eyepoint. Such distortion might be deliberate as in the case of a variable acuity system which optically increases the density of pixels (elements of the display) at the center of the screen.

Radially symmetric distortion can be accounted for by altering the spherical coordinates for raster transformation in accordance with the following formula. Specifically, Ps=Fr(P).

Ps specifies the corrected value, i.e. the position of the projected point in a radial direction from the original. Fr(P) specifies a function which maps the off-axis angle of a point to a radial distance on the pixel plane from the center of the screen.

The predistortion unit 110 may incorporate computer capability as implemented in accordance with the prior art for performing the calculations of the above equations. However, other corrections may be desired as to compensate radially asymmetric distortion. Such distortion can be a function of either the optical system, for example, an animorphic lens, or the projector position. If the screen is not a dome, but rather a cylinder for example, then radially asymmetric distortion could also be produced. Accordingly, the composite correction may be performed by a look-up table implemented to provide correction for specific edges as defined in terms of spherical coordinates somewhat as explained above with respect to the table embodied in the edge test circuit 102.

In addition to combining radially symmetric and asymmetric distortions into the predistortion table, the table can provide the results in terms of conventional raster coordinates Xs and Ys. That is, the projector formulates the picture by drawing a series of scan lines, usually proceeding from the top of the screen to the bottom, similarly to a television pattern. Ys specifies the scan line that the vertex will lie on while Xs specifies the position on that scan line. The vertices are in this form for the display processor.

Note that the method described earlier for determining whether an edge needs to be segmented, accounts for symmetric distortions but not for asymmetric distortions. To do this a Tmax value could be generated and used along with dT, dP and Pmax to decide whether an edge should be segmented. Also, an error criteria can be chosen such that the worst case distortion is handled for all values of Tmax. The result is that edges in some areas of the screen will be segmented more than needed to meet the error criteria. This effects the processing efficiency but the picture will appear correct.

On the basis of experience with actual systems implementing the present invention, an aspect of primary importance is the degree to which individual edges must be segmented to obtain an image of limited geometric error. The degree of subdivision is measured in terms of proliferation ratio which is the ratio of output polygon or drawn polygon to input or modeled polygon. Such considerations may be developed with respect to forming the table as used in the edge test circuit 102.

Recapitulating to some extent, the corrected signal values from the predistortion unit 110 (FIG. 8) are supplied from the segmenter and mapper 16 (FIG. 1) to the slope calculator 36 for further processing along the pipeline including the polygon buffer 38, the display processor 26, and finally the projector 18. As a result, as indicated above, the projector 18 receives raster scan signals for driving a high intensity cathode ray beam for projecting an image on the screen surface 12.

Of course, in the composition of the total image a considerable number of polygons are treated; however, the principles and processing are simply repetitive of those explained above.

As will be readily appreciated from the above explanation, the system hereof is susceptible to a large number of modifications and deviations within the basic conceptual framework. Accordingly, the scope hereof is deemed to be as set forth in the claims below.

What is claimed is:

1. An image generator system for curvilinear displays wherein images are developed from polygons having edges defined by signal-represented vertices, said generator comprising:

means for providing processed vertices signals defining edges for a desired image;

generator means for converting said processed vertices signals specifying edges to test vertices signals, which signals are in spherical coordinates and specify said edges at least in terms of two differential angles;

means for testing said test vertices signals specifying edges with respect to predetermined segmentation criteria to provide signals representative of acceptance or rejection;

means for segmenting said processed vertices signals defining an edge into other processed vertices signals defining plural equivalent edges, said means for segmenting connected for operation on occurrence of a rejection signal from said means for testing;

means for cycling said processed vertices signals defining edges through said generator means to said means for testing and through said means for segmenting to said means for providing processed vertices signals, to ultimately attain corrected vertices signals defining said edges in accordance with said predetermined segmentation criteria; and means coupled to receive said corrected vertices signals for displaying images.

2. A system according to claim 1 wherein said means for segmenting bisects an edge as defined by a pair of processed vertices signals to provide two pairs of processed vertices signals.

3. A system according to claim 1 wherein said generator means for converting said processed vertices signals comprises apparatus for implementing the conversion formula:

$$R=\sqrt{X^2+Y^2+Z^2}$$

$$T=\tan^{-1}(X/Y)$$

$$P=\tan^{-1}(\sqrt{X^2+Y^2}/Z)$$

where T and P specify spherical coordinates and X, Y, and Z specify rectangular coordinates.

4. A system according to claim 3 wherein said means for converting comprises means for generating test signals representative of differences in the quantities T and P for each edge and test signals representative of the maximum value of P for any part of an edge and means for testing said test signals against predetermined criteria.

5. A system according to claim 1 wherein said means for testing includes a look-up table means for distinguishing edges satisfactory for curvilinear display and wherein said look-up table is accessible on the basis of spherical coordinate angles.

6. A system according to claim 1 wherein said means for displaying images comprises a curvilinear screen and a curvilinear projector for projecting images on said screen.

7. In an image generator for curvilinear displays wherein images comprise polygons having edges defined by vertices, a segmenter-mapper apparatus comprising:

means for receiving signals representative of vertices defining image edges for a display;

test means for receiving signals defining said image edges in spherical coordinates wherein said edges are specified in at least two differential angles to test said image edges in accordance with predetermined segmentation criteria;

segmentation means for receiving signals defining said image edges in rectangular coordinates for segmenting said image edges to provide signals representative of vertices defining plural image edges equivalent to a received edge;

means for cycling signals defining said image edges in select coordinates between said test means and said segmentation means to attain signals defining image edges in accordance with said criteria; and means for correcting said signals defining said image edges in accordance with said criteria for curvilinear display.

8. A segmenter-mapper apparatus according to claim 7 wherein said means for receiving signals representative of vertices includes means for converting signals representative of vertices in rectangular coordinates to vertices in spherical coordinates.

9. A segmenter-mapper apparatus according to claim 8 wherein said spherical coordinates specify two angles and a distance.

10. A segmenter-mapper apparatus according to claim 8 wherein said test means comprises a table look-up computer structure entered solely on the basis of said signals derived from said two angles of spherical coordinates defining an edge.

11. A segmenter-mapper apparatus according to claim 7 wherein said spherical coordinates specify two angles and a distance and includes computer means for implementing the computation:

$$T = \tan^{-1}(X/Y)$$

$$P = \tan^{-1}(\sqrt{X^2 + Y^2}/Z)$$

$$R = X^2 + Y^2 + Z^2$$

wherein T, P and R specify spherical coordinates and X, Y and Z specify rectangular coordinates.

12. A segmenter-mapper apparatus according to claim 7 wherein said segmentation means includes an arithmetic structure for implementing the bisector expression:

$$X = X1(1 - \text{alpha}) + X2\ \text{alpha}$$

$$Y = Y1(1 - \text{alpha}) + Y2\ \text{alpha}$$

$$Z = Z1(1 - \text{alpha}) + Z2\ \text{alpha}$$

$$I = (I1 + I2)/2$$

where $\text{alpha} = R1/(R1 + R2)$.

13. A segmenter-mapper apparatus according to claim 7 wherein said test means includes a table means for distinguishing edges satisfactory for curvilinear display and wherein said table is accessible on the basis of spherical coordinate angles.

* * * * *

UNITED STATES PATENT AND TRADEMARK OFFICE
CERTIFICATE OF CORRECTION

PATENT NO. : 4,763,280
DATED : August 9, 1988
INVENTOR(S) : John A. Robinson and Robert A. Schumacker It is certified that error appears in the above-identified patent and that said Letters Patent is hereby corrected as shown below:

| Column | Line | |
|---|---|---|
| 6 | 26 | after "space" delete ")"; |
| 7 | 25 | after "fail" add a space before "signal"; |
| 8 | 21 | insert a hyphen between "special" and "purpose"; |
| 8 | 56 | delete "compared", second occurrence; |
| 11 | 34 | following "terms of" insert --a--; and |
| 14 | 5 | the equation should read as follows: |

$$R = \sqrt{X^2 + Y^2 + Z^2}$$

Signed and Sealed this

Seventeenth Day of January, 1989

Attest:

DONALD J. QUIGG

*Attesting Officer*   *Commissioner of Patents and Trademarks*